United States Patent [19]

Fernsler

[11] Patent Number: 4,827,194
[45] Date of Patent: May 2, 1989

[54] RASTER SIZE REGULATING CIRCUIT

[75] Inventor: Ronald E. Fernsler, Indianapolis, Ind.

[73] Assignee: Thomson Consumer Electronics, Inc., Princeton, N.J.

[21] Appl. No.: 190,983

[22] Filed: May 6, 1988

[51] Int. Cl.$^4$ .............................................. H01J 29/56
[52] U.S. Cl. ..................................... 315/371; 315/408
[58] Field of Search ................................. 315/371, 408

[56] References Cited

U.S. PATENT DOCUMENTS

| | | |
|---|---|---|
| 3,721,858 | 3/1973 | Shimizu . |
| 3,742,242 | 6/1973 | Morio et al. . |
| 3,828,123 | 8/1974 | Sato . |
| 3,949,270 | 4/1976 | Akatsu et al. . |
| 3,959,689 | 5/1976 | Ikoma . |
| 4,645,984 | 2/1987 | Sutherland et al. . |

Primary Examiner—Theodore M. Blum
Attorney, Agent, or Firm—E. M. Whitacre; J. J. Laks; H. D. Fried

[57] ABSTRACT

A high voltage generator of a television receiver includes a high voltage transformer having primary and high voltage windings. The high voltage winding is coupled to an ultor terminal of a picture tube via a high voltage rectifier. Retrace pulses applied to the primary winding are stepped up by the high voltage winding for generating an ultor voltage. A source of supply voltage is coupled to a current resupply terminal of the high voltage winding and produces voltage pulses at the resupply terminal having amplitudes which vary in accordance with ultor voltage loading. An envelope detector is coupled to the resupply terminal for envelope detecting amplitude variations of the voltage pulses to develop a size control signal which follows loading induced variations in ultor voltage. The size control signal is coupled to a scanning current modulator, such as a diode modulator, for modulating the scanning current in a manner that regulates the raster size.

8 Claims, 3 Drawing Sheets

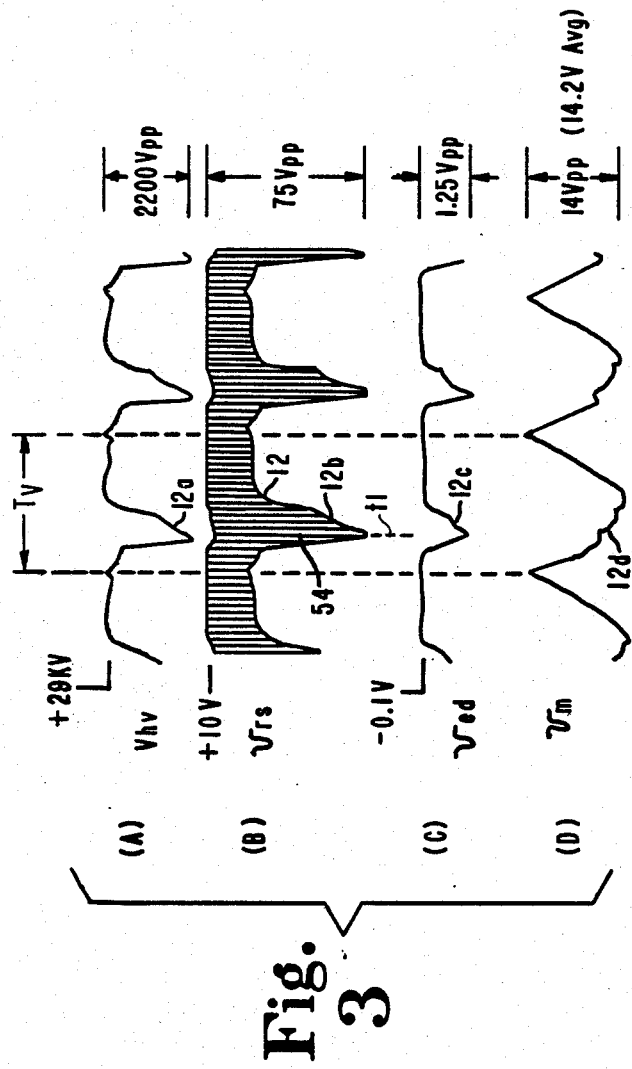
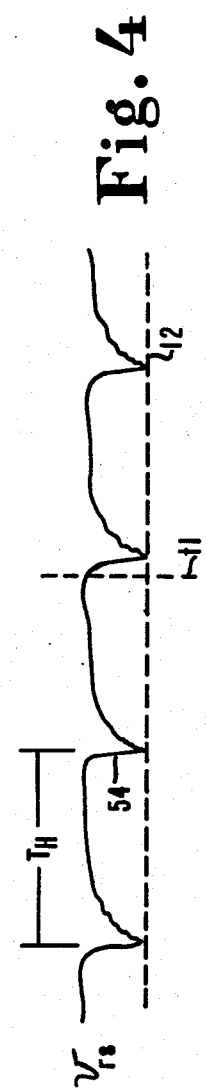

RASTER SIZE REGULATING CIRCUIT

This invention relates to a raster size regulating circuit.

In many television receivers or video display monitors, a combined scan and high voltage generator is utilized. Typically, an energy storage system is provided that includes a trace switch, a retrace capacitor, an S-shaping capacitor, and a horizontal deflection winding. During the retrace interval the switch is opened, forming a resonant retrace circuit that develops a large amplitude retrace pulse across the deflection winding. The deflection winding generates a sawtooth shaped current which is used to deflect the electron beams horizontally across the screen of the picture tube. At the same time, the deflection retrace pulse may be used in conjunction with an integrated high voltage transformer (IHVT) to generate the ultor voltage that accelerates the electron beams to the phosphor screen of the picture tube.

The IHVT includes a high voltage winding which is segmented into several winding sections. A high voltage diode is coupled in series with each winding segment. The large amplitude retrace pulse voltage is applied to the primary winding of the IHVT, stepped up by the high voltage winding, and rectified by the high voltage diodes to develop an ultor voltage of illustratively 24 to 29 kilovolt.

The low-AC end of the IHVT may be used to sample the beam current being drawn by the picture tube anode electrode that is coupled to the ultor terminal. Sampling is performed at a current resupply terminal of the high voltage winding remote from the ultor terminal. The current resupply terminal is interposed in the DC current path between a relatively low DC voltage source and the low-AC end of the high voltage winding.

The voltage at the resupply terminal will vary in accordance with picture tube loading on the ultor terminal. As more beam current is drawn from the anode of the picture tube due to increased video drive on the cathode, the voltage at the resupply terminal will decrease. This voltage is monitored by an automatic beam limiter circuit. At a certain design threshold voltage, the automatic beam limiter circuit will limit the drive at the cathode and thus limit the current being supplied by the IHVT.

The IHVT has a typical source impedance of, illustratively, 1 megaohm, and delivers ultor current of 1 to 2 milliampere average, depending upon the desired picture power of the television receiver. Short duration, peak ultor current may reach 10 milliampere in value. As beam current is drawn by the picture tube anode, the ultor voltage will drop because of the IHVT impedance and because of the relatively low ultor terminal capacitance formed by the inner and outer conductive coatings of the picture tube. The ultor terminal capacitance may equal 1400 picofarad in a 20 inch picture tube and 2700 picofarad in a 26 inch picture tube. The lower the ultor capacitance, the greater the decrease in ultor voltage with beam current loading.

Deflection sensitivity and thus raster size is a function of ultor voltage. Variations in ultor voltage produced by variations in beam current loading may produce undesirable variations in raster size that distort the picture displayed on the picture tube screen.

A most severe type of beam current loading is produced by the video signal drive of a block pattern picture illustrated in FIG. 2A. The block pattern consists of high brightness, rectangular, white blocks B1 and B2, positioned on either side of a white vertical line VL0 that is positioned in the center of the picture. The rectangular blocks B1 and B2 are positioned only in the upper half of the picture. White vertical lines VL1 and VL2 are positioned at the left and right edges, respectively, of the picture.

During the first half of vertical scan, when the video signal of blocks B1 and B2 drive the cathode of the picture tube, the ultor terminal experiences heavy beam current loading and the ultor voltage decreases. The increased deflection sensitivity caused by the decrease in ultor voltage results in increased width of the raster lines scanned during the first half of vertical scan. This produces a distorted display of the block pattern.

As illustrated in FIG. 2B, during the time of increased beam loading, during the first half of vertical scan, the raster will bend outwardly in a symmetrical manner with respect to the center vertical line VL0. The center line VL0, however, remains undistorted. Especially noticeable and objectionable are the outwardly bent sections S1 and S2 of respective vertical lines VL1 and VL2.

The block pattern of FIG. 2A exhibits severe picture distortion due to beam current loading effects. Similar distortions may be observed when the displayed picture includes large blocks of lettering or includes computer generated block-like patterns.

In accordance with an aspect of the invention, a raster size regulating circuit counters the picture distorting tendencies, described above, that may be attributed to beam current loading of the ultor terminal. A high voltage generator includes a high voltage transformer having a first winding to which first voltage pulses are coupled. A high voltage winding is coupled to a picture tube ultor terminal via a high voltage rectifying means and generates thereat an ultor voltage. A source of supply voltage is coupled to a current resupply terminal of the high voltage winding at a point remote from the ultor terminal. Second voltage pulses are produced at the resupply terminal and have amplitudes which vary in accordance with loading on the ultor voltage. An envelope detector is coupled to the resupply terminal for envelope detecting the amplitude variations of the second voltage pulses to develop a size control signal which follows the loading induced variations in ultor voltage. The size control signal is coupled to a scanning current modulator that modulates the scanning current in a manner that regulates raster size.

FIGS. 3A–3D and FIG. 4 illustrate waveforms useful in explaining the operation of the circuit of FIG. 1.

Figure 1:
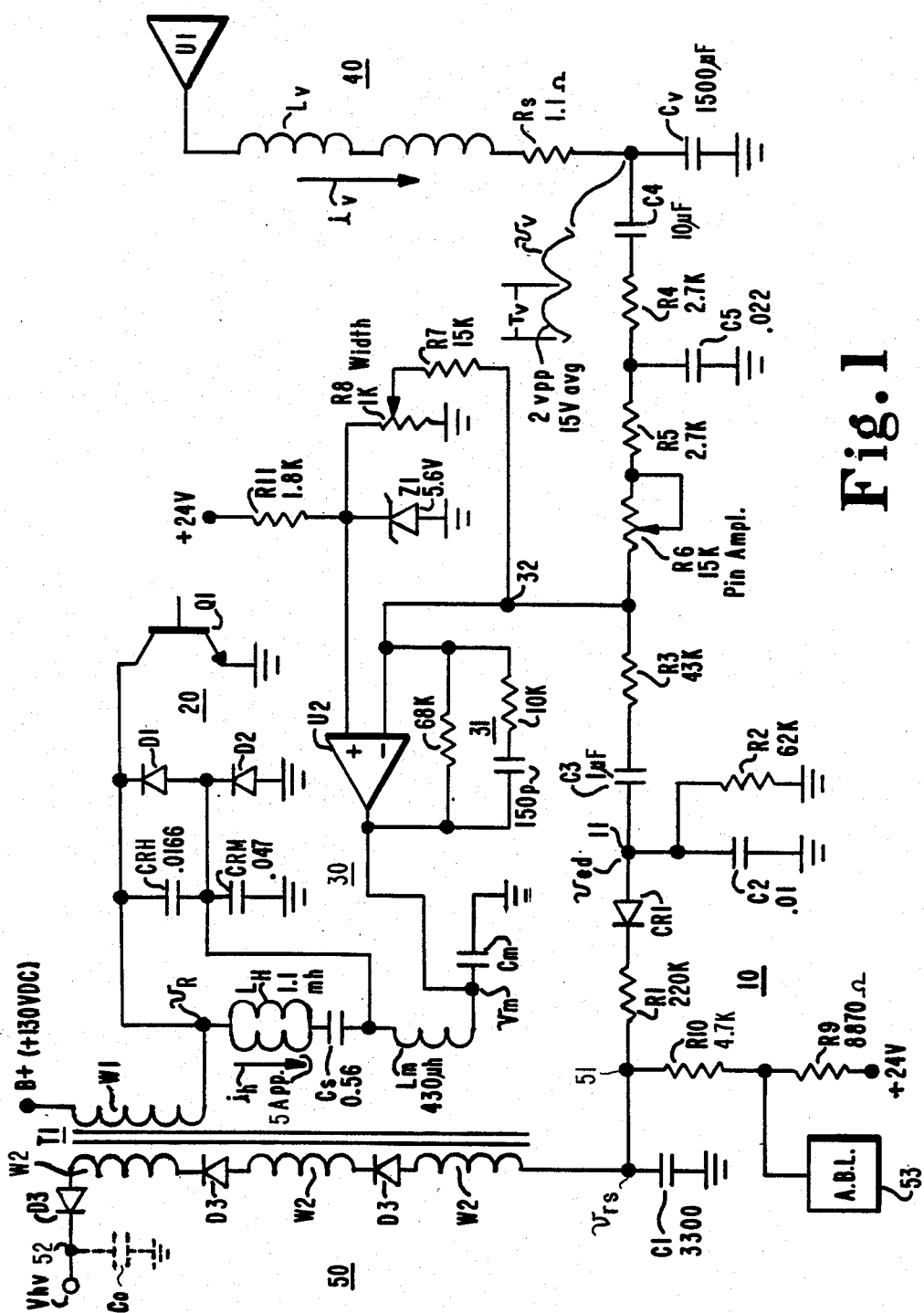
FIG. 1 illustrates a raster size regulating circuit, according to the invention.

In FIG. 1, a B+ voltage is applied to the primary winding W1 of a flyback transformer T1. Primary winding W1 is coupled to a horizontal deflection output stage 20 comprising a horizontal output transistor Q1, a deflection damper diode D1, a deflection retrace capacitor $C_{RH}$ and a horizontal deflection winding $L_H$ coupled in a series relationship with an S-shaping capacitor $C_s$. A horizontal oscillator and driver, not illustrated in FIG. 1, provides the horizontal rate switching of transistor Q1 to generate horizontal scanning current $i_H$ in deflection winding $L_H$ and a retrace pulse voltage $v_R$ at the collector transistor Q1.

A diode modulator 30 provides a means for modulating scanning current $i_H$ to provide side pincushion correction of the raster scanned on the phosphor screen of a picture tube, not shown in FIG. 1. Diode modulator 30 includes a modulator induct $L_m$, a modulator trace capacitor $C_m$, a modulator damper diode D2, and a modulator retrace capacitor $C_{Rm}$. The modulator voltage $v_m$ developed across modulator capacitor $C_m$ is modulated by an amplifier U2 to provide the required side pincushion correction.

A vertical deflection circuit 40 includes an amplifier U1 that generates vertical scanning current $i_V$ in a vertical deflection winding $L_V$. A current sampling resistor $R_s$ and a DC-blocking capacitor $C_V$ are coupled in series with vertical deflection winding $L_V$. A vertical parabola voltage $v_V$ developed by vertical deflection circuit 40 is, first, AC coupled by a capacitor C4, then attenuated and filtered by a T-network comprising resistors R4 and R5, a variable resistor R6, and a capacitor C5, and then applied to a terminal 32.

The attenuated vertical parabola voltage is summed at terminal 32 with an adjustable DC voltage that is developed at the wiper arm of a potentiometer R8 and coupled to terminal 32 via a resistor R7. The voltage developed at terminal 32 is applied to the inverting input terminal of amplifier U2. Adjustment of variable resistor R6 controls the pincushion correction amplitude. Adjustment of potentiometer R8 controls static raster width. An RC network 31 is coupled between the output terminal of amplifier U2 and the inverting input terminal for providing negative feedback and stable amplifier operation. A reference voltage developed by a zener diode D1 is coupled to the noninverting input terminal of amplifier U2. Zener diode biasing is provided by a +24V voltage source that is coupled to the zener diode via a resistor R11.

Flyback transformer T1 functions as a high voltage transformer of a high voltage generator 50 that generates an ultor voltage $V_{HV}$ at an ultor terminal 52. To generate ultor voltage $V_{HV}$, retrace pulse voltage $v_R$ is applied to primary winding W1, stepped up by the segmented high voltage winding W2, rectified by corresponding high voltage diodes D3, and filtered by an ultor capacitance C0 to develop the DC ultor voltage $V_{HV}$. The ultor capacitance may be provided by the capacitance formed between the inner and outer conductive coatings of the picture tube.

The DC current path to ultor terminal 52 begins at a +24V supply terminal, goes through resistors R9 and R10 to a resupply terminal 51 that is coupled to the low-AC end of high voltage winding W2. An automatic beam limiter circuit 53 is coupled to the junction of resistors R9 and R10 for limiting video drive to the picture tube when beam current loading on ultor terminal 52 reaches a predetermined value.

In accordance with an aspect of the invention, the voltage $v_{rs}$ developed at resupply terminal 51 is coupled to an envelope detector 10 to generate a raster size control signal that is coupled to terminal 32 of the diode modulator for regulating raster size as a function of beam current loading.

Envelope detector 10 includes the series arrangement of a rectifier CR1 and a resistor R1. The series arrangement is coupled between current resupply terminal 51 and a terminal 11, with the anode of rectifier CR1 being coupled to terminal 11. A capacitor C2 is coupled between terminal 11 and ground. A resistor R2 is coupled across capacitor C2.

The current supplied to high voltage winding W2 by way of the +24V supply is in the form of relatively sharp, horizontal rate, current pulses flowing into resupply terminal 51. As illustrated in FIG. 4 by the voltage $v_{rs}$, the current pulses generate corresponding negative going voltage pulses 54, repeating at the horizontal rate $1/T_H$, where $T_H$ equals the horizontal deflection interval. Higher frequency ringing due to tuning of the flyback transformer is superimposed on the positive going portions of voltage pulses 54. A high frequency bypass capacitor C1 is coupled between terminal 51 and ground.

The amplitude of the negative going, horizontal rate pulses 54 varies as a function of beam current loading on ultor terminal 52. As more beam current is drawn by the anode of the picture tube due to increased video drive on the cathode, voltage pulses 54 will become even more negative, with the negative peaks of the pulses following the beam current loading.

Figure 2A:
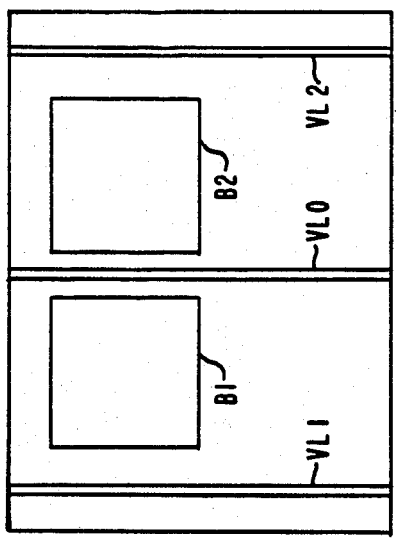
FIG. 2A illustrates a picture of a block pattern that is to be displayed on the screen of a picture tube.
Figure 2B:
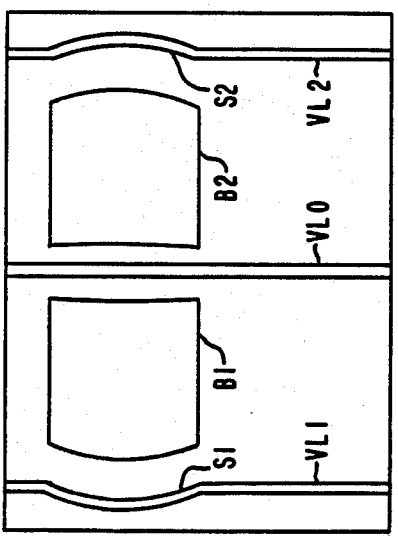
FIG. 2B illustrates a distorted block pattern picture that may be produced by beam current loading effects on the ultor terminal.

Consider a situation where the video signal driving the picture tube cathode represents the block pattern picture of FIG. 2A. The resulting, severe vertical rate, beam current loading of ultor terminal 52 causes ultor voltage $V_{HV}$ to drop each vertical interval, $T_V$, when blocks B1 and B2 are displayed on the picture tube screen, as illustrated in FIG. 3A by the waveform portion 12a of ultor voltage $V_{HV}$. The decrease in ultor voltage produces an increased deflection sensitivity which tends to cause the raster width to increase, thereby tending to produce the outwardly bent segments S1 and S2 of vertical lines VL1 and VL2 in FIG. 2B.

In accordance with a feature of the invention, envelope detector 10 of FIG. 1 counters the tendency of the raster width to vary under beam current loading. Voltage $v_{rs}$ developed at current resupply terminal 51 is coupled to envelope detector 10. Voltage $v_{rs}$ is illustrated in FIG. 3B. The time scale of FIG. 3B is the larger vertical interval time scale as opposed to the horizontal interval time scale of FIG. 4. The negative going horizontal rate pulses 54 occurring in FIG. 4 near time t1 are only shown schematically in FIG. 3B by means of closely spaced vertical lines.

Because the negative going peaks of voltage pulses 54 of FIG. 4 closely follow beam current loading on ultor terminal 52, the envelope 12 of the negative pulses also closely follows the beam current loading. At the vertical interval time scale of FIG. 3B, it is noted that envelope 12 of the negative voltage pulses of voltage $v_{rs}$ closely follows in waveshape the waveshape of voltage $V_{HV}$ of FIG. 3A. Thus, the sagging portion 12a of ultor voltage $V_{HV}$ has a corresponding sagging portion 12b in envelope 12 of voltage $v_{rs}$.

Rectifier CR1 of envelope detector 10 is poled to conduct current during the negative going excursions of voltage pulses 54 of FIG. 4. Capacitor C2 is charged each horizontal interval via resistor R1 and rectifier CR1 to a negative voltage that depends on the amplitudes of the negative going portions of voltage pulses 54. Resistor R2 allows capacitor C2 to slightly discharge within each horizontal interval when rectifier CR1 is blocked. This enables the voltage $v_{ed}$ developed at terminal 11 to closely follow the envelope of the voltage pulses of voltage $V_{rs}$. As illustrated in FIGS. 3B and 3C, the waveshape of voltage portion 12c of envelope detector voltage $v_{ed}$ closely follows in waveshape portion 12b of the envelope 12 of voltage $V_{rs}$. Advantageously, as a result of the envelope detection, the portion 12c of envelope detector voltage $v_{ed}$ closely follows in waveshape the sagging voltage portion 12a of ultor voltage $V_{HV}$, as illustrated in FIGS. 3A and 3C.

The operation of envelope detector 10 is analogous to that of a diode detector of an amplitude modulated carrier signal. The horizontal rate pulses 54 of FIG. 4 provide the function of a carrier signal at the horizontal frequency. The carrier signal is then amplitude modulated by a signal having a waveshape similar to that of ultor voltage $V_{HV}$ of FIG. 3A. The result of the amplitude modulation is an amplitude modulated signal $v_{rs}$ of FIG. 3B, wherein at least the lower envelope 12 closely follows the waveshape of the modulating signal.

The time constants associated with the RC network in envelope detector 10 when rectifier CR1 is conducting or when blocked are selected on the basis of filtering out large horizontal rate components from envelope detector voltage $v_{ed}$, while enabling the voltage $v_{ed}$ to follow the negative going amplitude variations of the voltage pulses of voltage $V_{rs}$. The ratio of resistors R1 and R2 is selected to attenuate voltage $v_{ed}$ to the proper amplitude required by the control circuitry of diode modulator 30.

Envelope detector voltage $v_{ed}$ is AC coupled via a capacitor C3, further attenuated by a resistor R3, and summed at terminal 32 with the other diode modulator control voltages. In an alternative configuration, attenuating resistor R3 may be omitted. To achieve the same attenuation level at terminal 32 for envelope detector voltage $v_{ed}$, a voltage divider, not shown in FIG. 2, may be coupled between terminal 51 and ground. The input to envelope detector 10 will then be located at an intermediate point in the voltage divider.

To achieve raster size regulation with ultor terminal beam current loading, the AC coupled envelope detector voltage $v_{ed}$ is subtracted from the AC coupled parabola voltage $v_V$. The resultant voltage is inverted at the output of amplifier U2 to develop modulator voltage $v_m$, illustrated in FIG. 3D. FIG. 3D omits from illustration any horizontal rate ripple component of voltage $v_m$.

During heavy beam current loading by blocks B1 and B2 of FIG. 2A, during the first half of vertical scan, the amplitude of negative going parabola voltage $v_m$ is modified in accordance with envelope detector voltage $v_{ed}$. Voltage portion 12d of modulator $v_m$ is made more positive. The more positive modulator voltage $v_m$ produces a decreased deflection trace voltage across S-shaping capacitor $C_s$, a decreased amplitude of scanning current $i_H$, and a decreased raster width. The decreased raster width counters the tenancy of the raster to expand during the interval within vertical scan when blocks B1 and B2 are displayed. In this way, a dynamic raster width regulation capability is provided that compensates for rapid fluctuations in beam current levels that occur within as short a time interval as a vertical deflection interval.

Envelope detector 10 has the further advantage of following ultor voltage fluctuations across the entire range of average brightness levels, from high brightness levels down to minimal brightness levels. Even low levels of beam current loading will be detected by envelope detector 10 because of the nature of the current pulses that flow to resupply terminal 51 each horizontal interval.

As a still further advantage, by supplying voltage $v_{ed}$ as a size control signal to a side pincushion correction circuit such as a diode modulator, the ultor voltage remains unaffected by the size control signal modulation of the scanning current. Had it been otherwise, the concurrent modulation of the ultor voltage would have tended to cancel the size regulating effects of the modulation of the scanning current.

What is claimed:

1. A raster size regulating circuit, comprising:
   a high voltage generator including a high voltage transformer having a first winding to which first voltage pulses are applied and a high voltage winding coupled to an ultor terminal of a picture tube via a high voltage rectifying means for generating an ultor voltage, wherein variation in loading on said ultor terminal due to variation in picture content produces a corresponding variation in ultor voltage;
   a source of supply voltage coupled to a current resupply terminal of said high voltage winding remote from said ultor terminal and producing thereat second voltage pulses having amplitudes which vary in accordance with said ultor terminal loading;
   a deflection winding;
   a deflection output stage for generating scanning current in said deflection winding;
   means coupled to said deflection winding for modulating said scanning current; and,
   an envelope detector coupled to said resupply terminal for envelope detecting amplitude variation of said second voltage pulses to develop a size control signal which follows the variation in ultor voltage, said size control signal being coupled to said modulating means for modulating said scanning current in a manner that regulates said raster size.

2. A circuit according to claim 1 wherein said envelope detector includes a rectifier that is poled to conduct current during negative-going excursions of said second voltage pulses.

3. A circuit according to claim 1 wherein said envelope detector has a response characteristic which enables said detector to follow an ultor voltage variation that occurs within a vertical deflection interval.

4. A circuit according to claim 3 wherein said envelope detector includes a first resistor coupled to said resupply terminal in a series relationship with a rectifier, a capacitor coupled to an electrode of said rectifier remote from said resupply terminal, and a resistor coupled in a parallel relationship with said capacitor for developing said size control signal in said capacitor.

5. A circuit according to claim 1 wherein said modulating means comprises a side pincushion modulator responsive to a side pincushion correction signal for providing a side pincushion corrected scanning current.

6. A circuit according to claim 5 wherein said side pincushion correction signal and said size control signal are summed at a control terminal of said side pincushion modulator.

7. A circuit according to claim 5 wherein said high voltage transformer comprises a flyback transformer, with said first winding being coupled to said deflection output stage, and wherein said side pincushion modulator comprises a diode modulator that modulates said scanning current in accordance with said size control signal without thereby producing significant modulation of said ultor voltage.

8. A circuit according to claim 7 wherein said envelope detector includes a first resistor coupled to said resupply terminal in a series relationship with a rectifier, a capacitor coupled to an electrode of said rectifier remote from said resupply terminal, and a resistor coupled in a parallel relationship with said capacitor for developing said size control signal in said capacitor.

* * * * *